E. STERNS.
VEHICLE TIRE.
APPLICATION FILED MAR. 6, 1917.
1,367,995.
Patented Feb. 8, 1921.
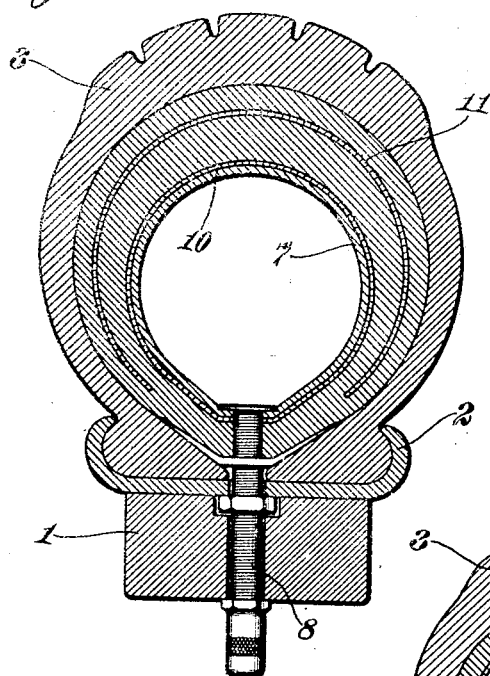
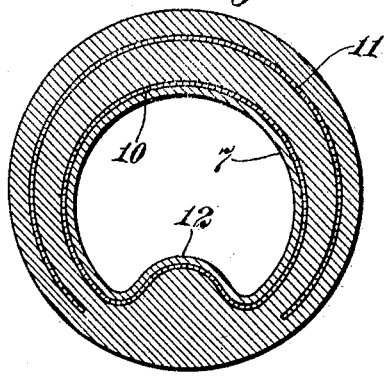
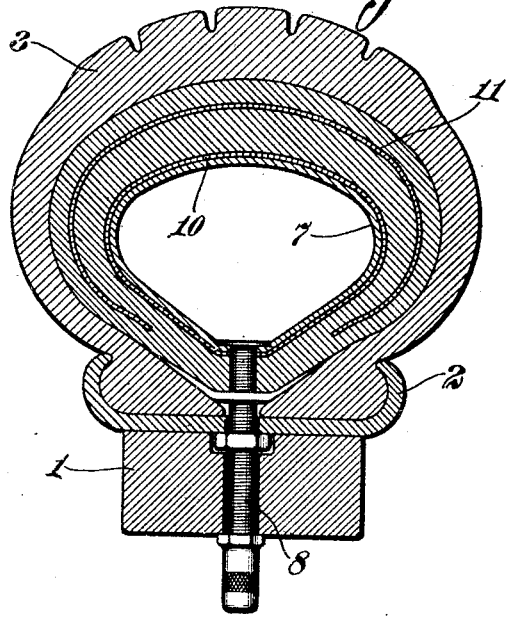
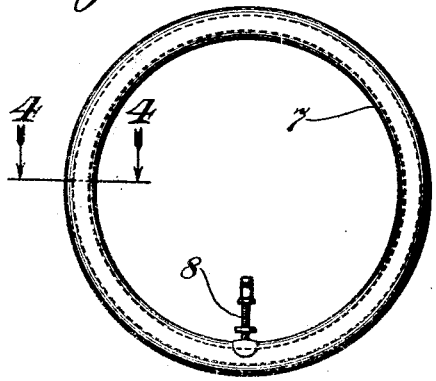
Inventor:
EDWARD STERNS,
By John H. Bruninga
His Attorney.

UNITED STATES PATENT OFFICE.

EDWARD STERNS, OF ST. LOUIS, MISSOURI, ASSIGNOR, BY MESNE ASSIGNMENTS, TO SURETY TIRE & RUBBER COMPANY, OF WILMINGTON, DELAWARE, A CORPORATION OF DELAWARE.

VEHICLE-TIRE.

1,367,995. Specification of Letters Patent. Patented Feb. 8, 1921.

Application filed March 6, 1917. Serial No. 152,905.

*To all whom it may concern:*

Be it known that I, EDWARD STERNS, a citizen of the United States, and residing at St. Louis, State of Missouri, have invented a certain new and useful Improvement in Vehicle-Tires, of which the following is a specification.

This invention relates to vehicle tires, and more particularly to tires embodying a casing and an inner tube.

In U. S. Patent No. 1,218,486, granted March 6, 1917, I have shown and described a vehicle tire embodying an inflatable inner tube comprising a body material having the characteristics of rubber, and a reinforcing material joined together to form an integral structure, the tube wall increasing in thickness from the inner to the outer circumference of the tube. The reinforcing material is arranged to permit transverse expansion of the tube. The reinforcing material is also arranged in spaced layers embedded in the body material, so as to form a structure in which punctures are not only prevented, but any punctures which are formed are self-closing.

Some of the objects of this invention are to provide a special form of inner tube of the character shown and described in the patent referred to, but in which special means are provided for permitting transverse expansion of the tube.

Further objects will appear from the detail description taken in connection with the accompanying drawing, in which:

Figure 1 is a section through a vehicle tire embodying this invention, and showing the tire inflated;

Fig. 2 is a section similar to Fig. 1, but showing the tire partially compressed;

Fig. 3 is a side elevation of the deflated inner tube; and,

Fig. 4 is a section on the line 4—4, Fig. 3.

Referring to the accompanying drawing, 1 designates a wheel felly provided with a rim 2 adapted to receive a casing 3. The wheel, rim and casing may be of any suitable construction, the casing being in this case of the clencher type.

The inner tube 7, provided with a valve stem 8 of usual construction, is, as in the patent referred to, formed of a body material of inner tube rubber or of a suitable material having the characteristics of rubber, and the wall thickness increases from the inner to the outer circumference of the tube. The body material has also embedded therein to form an integral structure spaced layers 10 and 11 of a reinforcing material such as sea island cotton. In accordance with this invention, however, the inner layer 10 extends uninterruptedly transversely along the inside wall of the tube, while the outer layer 11 extends only partially around the tube, so as to provide a break therein at its inner circumference. The tube is thickened to form an inward projection or rib 12 along the inner circumference of the tube, and the inner layer 10 of fabric is arranged to follow the inside wall of the tube and of the inwardly projecting ridge.

When the tube is inflated the tube walls cannot stretch transversely where the reinforcing layers parallel the sides and outer circumferences of the tube, since the fabric is inelastic. Inflation of the tube under pressure of 75 pounds will, however, straighten out the reinforcement 10 where it parallels the inner surface of the ridge 12, the rubber stretching at this point as shown in Figs. 1 and 2, which show the tube inflated, and the break in the outer layer 11 allowing stretching of the rubber at the inner circumference, so that, when the tube is fully inflated, the reëntrant or inwardly extending part of the reinforcing layer 10 will conform to the inflated tube. The tube wall will, therefore, increase in thickness from the inner to the outer circumference of the tube.

With this tube, as in the patent referred to, a layer of rubber is imprisoned between the layers of fabric, and puncturing of the tube will, therefore, cause the rubber between the two inelastic layers of fabric to close any puncture which may be formed. It will be noted that the stretch of the rubber will come at the inner circumference of the tube, where it is protected by the rim and not subject to punctures. In this tire, also, the breaking lines of the tube correspond with the breaking lines of the casing.

It is obvious that various changes may be made in the details of construction without departing from the spirit of this invention.

It is, therefore, to be understood that this invention is not to be limited to the specific details shown and described.

Having thus described the invention, what is claimed is:

1. In a pneumatic vehicle tire, the employment of an inflatable inner tube comprising a body material having the characteristics of rubber and spaced layers of an inelastic material embedded in the body material so as to confine a puncture closing layer of the body material therebetween, one of said layers extending in an uninterrupted circuit and the other layer having a break therein, adapted and arranged to prevent expansion of the confined material but permit expansion of the tube, substantially as and for the purpose set forth.

2. In a pneumatic vehicle tire, the employment of an inflatable inner tube comprising a body material having the characteristics of rubber and spaced layers of an inelastic material embedded in the body material so as to confine a puncture closing layer of the body material therebetween, the inner layer extending in an uninterrupted circuit and the outer layer having a break therein, adapted and arranged to prevent expansion of the confined material but permit expansion of the tube, substantially as and for the purpose set forth.

3. In a pneumatic vehicle tire, the employment of an inflatable inner tube comprising a body material having the characteristics of rubber and spaced layers of an inelastic material embedded in the body material so as to confine a puncture closing layer of the body material therebetween, one of said layers extending in an uninterrupted circuit and the other layer having a break therein at the inner circumference of the tube, adapted and arranged to prevent expansion of the confined material but permit expansion of the tube, substantially as and for the purpose set forth.

4. In a pneumatic vehicle tire, the employment of an inflatable inner tube comprising a body material having the characteristics of rubber and spaced layers of an inelastic material embedded in the body material so as to confine a puncture closing layer of the body material therebetween, the inner layer extending inwardly and the outer layer having a break therein at the inner circumference of the tube, adapted and arranged to prevent expansion of the confined material but permit expansion of the tube, substantially as and for the purpose set forth.

5. In a vehicle tire, the employment of an inflatable inner tube of elastic material, having combined therewith at the tread thereof, layers of inelastic material disposed in axially spaced relation to confine a puncture closing layer of the elastic material therebetween, one of said layers extending in an uninterrupted circuit, and the other layer having a break therein, constructed and arranged to permit transverse expansion of the tube, but prevent expansion of the confined layer of elastic material at the tread, substantially as and for the purpose set forth.

6. In a vehicle tire, the employment of an inflatable inner tube of rubber increasing in thickness from the tire rim to the tread, and having embedded therein fabric strips extending transversely around the tube and disposed in axially spaced relation at the tread to confine a puncture closing layer of the rubber therebetween, one of said fabric strips being interrupted at the tread, and the other fabric strip extending in an uninterrupted circuit but formed to yield at the tread, adapted to permit transverse expansion of the tube at the rim but prevent expansion at the tread, substantially as and for the purpose set forth.

In testimony whereof I affix my signature this 5th day of July, 1916.

EDWARD STERNS.